(12) United States Patent
Bunnell et al.

(10) Patent No.: US 12,269,364 B2
(45) Date of Patent: Apr. 8, 2025

(54) REAL-TIME MODIFICATION OF CHARGE TERMINATION VOLTAGE AND CURRENT AND ASSOCIATED CONTROLS FOR ELECTRIC VEHICLES

(71) Applicant: GM GLOBAL TECHNOLOGY OPERATIONS LLC, Detroit, MI (US)

(72) Inventors: Justin Bunnell, Farmington Hills, MI (US); John C. Lyons, Canton, MI (US); Sudhakar Inguva, Troy, MI (US); Ryan B. Moulliet, Farmington Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 219 days.

(21) Appl. No.: 17/990,808

(22) Filed: Nov. 21, 2022

(65) Prior Publication Data

US 2024/0166070 A1    May 23, 2024

(51) Int. Cl.
*B60L 53/62* (2019.01)
*B60L 53/14* (2019.01)
*B60L 53/20* (2019.01)
*B60L 53/66* (2019.01)

(52) U.S. Cl.
CPC .............. *B60L 53/62* (2019.02); *B60L 53/14* (2019.02); *B60L 53/20* (2019.02); *B60L 53/66* (2019.02)

(58) Field of Classification Search
CPC .......... B60L 53/62; B60L 53/20; B60L 53/14; B60L 53/66
See application file for complete search history.

(56) References Cited

U.S. PATENT DOCUMENTS

| | | | | |
|---|---|---|---|---|
| 5,684,387 | A | * | 11/1997 | Patino ............... H02J 7/00047 324/427 |
| 9,287,727 | B1 | * | 3/2016 | Egan .................. H02J 7/00309 |
| 2020/0062138 | A1 | * | 2/2020 | Smolenaers ........... B60L 55/00 |

FOREIGN PATENT DOCUMENTS

KR    102201988 B1 *  1/2021

OTHER PUBLICATIONS

English Machine Translation of KR102201988B1 (Year: 2021).*
U.S. Appl. No. 17/554,496, filed Dec. 17, 2021, Bednar et al.

* cited by examiner

*Primary Examiner* — Andrew J Cromer

(57) ABSTRACT

A charging system for an electric vehicle includes: a memory configured to store terminal clamp voltage (CV) and a cutoff current (CC) combination pairs; a charging receptacle configured to connect to an offboard charging station; and an onboard charging circuit. The onboard charging circuit includes: a high-voltage direct current bus connected to a rechargeable energy storage system; and a control module configured to communicate with the offboard charging station and determine charging capabilities of the offboard charging station and the onboard charging circuit, to select one of the CV and CC combination pairs based on the charging capabilities of the offboard charging station and the onboard charging circuit, and to initiate charging of the rechargeable energy storage system based on the selected one of the CV and CC combination pairs.

20 Claims, 10 Drawing Sheets

REAL-TIME MODIFICATION OF CHARGE TERMINATION VOLTAGE AND CURRENT AND ASSOCIATED CONTROLS FOR ELECTRIC VEHICLES

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to charging systems for energy rechargeable storage systems of vehicles.

Electric vehicles, such as fully electric vehicles, battery electric vehicles (BEVs), and hybrid electric vehicles including plug-in hybrid electric vehicles (PHEVs), include high-voltage (HV) battery packs. The HV battery packs provide power to HV direct current (DC) loads and to an auxiliary power module that converts a high voltage to a low voltage to charge a low-voltage (LV) power source (or battery). The LV power source is used to power LV DC loads. The HV loads may include motors, which are used for propulsion purposes as well as other HV loads. The LV loads may include, for example, lights, window and seat motors, door locks, infotainment system devices, etc. The HV battery packs may have terminals at, for example, 400V or 800V. The LV power sources may have terminals at, for example, 12V or 48V.

SUMMARY

A charging system for an electric vehicle is disclosed. The charging system includes: a memory configured to store terminal clamp voltage (CV) and a cutoff current (CC) combination pairs; a charging receptacle configured to connect to an offboard charging station; and an onboard charging circuit. The onboard charging circuit includes: a high-voltage direct current bus connected to a rechargeable energy storage system; and a control module configured to communicate with the offboard charging station and determine charging capabilities of the offboard charging station and the onboard charging circuit, to select one of the CV and CC combination pairs based on the charging capabilities of the offboard charging station and the onboard charging circuit, and to initiate charging of the rechargeable energy storage system based on the selected one of the CV and CC combination pairs.

In other features, the charging system further includes an onboard charging module configured to: convert an alternating current voltage received from the offboard charging station via the charging receptacle to a direct current voltage and supply the direct current voltage to the high-voltage direct current bus; indicate to the control module the alternative current voltage; and receive an instruction from the control module to convert the alternating current voltage to the CV of the one of the CV and CC combination pairs for charging the rechargeable energy storage system.

In other features, the control module is configured to: look up or calculate an estimated charge power value for each of at least some of the CV and CC combination pairs to provide charge power values; and based on the charge power values, select the one of the CV and CC combination pairs with the estimated charge power closest to but not greater than a smaller of a) a power capability of the offboard charging station, and b) a power capability of the onboard charging circuit.

In other features, the control module is configured to: determine a depth of discharge; look up or calculate an estimated life expectancy of the rechargeable energy storage system for each of at least some of the CV and CC combination pairs; and based on the depth of discharge, select the one of the CV and CC combination pairs resulting in a rechargeable energy storage system life expectancy being closest to a target life expectancy without being shorter than the target life expectancy.

In other features, the control module is configured to: estimate at least one of resistance uncertainty and growth of the rechargeable energy storage system; based on the at least one of resistance uncertainty and growth, look up or calculate estimated charge termination state of charge uncertainty of the rechargeable energy storage system for each of at least some of the CV and CC combination pairs; and based on the estimated charge termination state of charge uncertainties, select the one of the CV and CC combination pairs resulting in a charge termination state of charge uncertainty being closet to a target charge termination state of charge uncertainty without exceeding the target charge termination state of charge uncertainty.

In other features, the control module is configured to: for each of at least some of the CV and CC combination pairs, estimate a change in resistance of the rechargeable energy storage system, estimate an open circuit voltage based on the change in resistance and current supplied to the rechargeable energy storage system, estimate state of charge based on the estimated open circuit voltage, and determine a state of charge error based on the estimated state of charge and a target state of charge; and select the one of the CV and CC combination pairs with a highest corresponding power and having a state of charge error within a set error range.

In other features, the control module is configured to: determine whether the offboard charging station is a public station; determine whether the offboard charging station has a time-based cost for charging; in response to determining the offboard charging station being a public station and having a time-based cost for charging, look up or calculate estimated charge power values for each of at least some of the CV and CC combination pairs to provide charge power values; and based on the charge power values, select the one of the CV and CC combination pairs with the estimated charge power closest to but not greater than a smaller of a) a power capability of the offboard charging station, and b) a power capability of the onboard charging circuit.

In other features, the control module is configured to: determine whether the offboard charging station is a public station; in response to determining that the offboard charging station is a public station, implement a charge time minimization method to select the one of the CV and CC combination pairs; and in response to determining that the offboard charging station is not a public station, implement a maximum life charging method to select one of the CV and CC combination pairs.

In other features, the control module is configured to: determine a depth of discharge; determine a resistance uncertainty or growth of the rechargeable energy storage system; based on the depth of discharge, filter out some of the CV and CC combination pairs that do not satisfy a life requirement for the rechargeable energy storage system to provide a first resultant set of CV and CC combination pairs; filter out some of the first resultant set of CV and CC combination pairs that do not satisfy a state of charge accuracy requirement to provide a second resultant set of CV and CC combination pairs; and implement a charge time minimization method to select the one of the CV and CC combination pairs from the second resultant set of CV and CC combination pairs.

In other features, the control module is configured to: determine whether the offboard charging station is a direct current charging station or an alternating current charging station; in response to the offboard charging station being a direct current charging station, instruct the offboard charging station to charge the rechargeable energy storage system based on the selected CV and CC combination pair; and in response to the offboard charging station being an alternating current charging station, charge the rechargeable energy storage system based on the selected CV and CC combination pair.

In other features, a method of charging a rechargeable energy storage system of an electric vehicle is disclosed. The method includes: storing terminal clamp voltage (CV) and a cutoff current (CC) combination pairs; transferring power between an offboard charging station and a high-voltage direct current bus of an onboard charging circuit of the electric vehicle, the high-voltage direct current bus being connected to a rechargeable energy storage system; communicating with the offboard charging station and determining charging capabilities of the offboard charging station and the onboard charging circuit; selecting one of the CV and CC combination pairs based on the charging capabilities of the offboard charging station and the onboard charging circuit; and charging of the rechargeable energy storage system based on the selected one of the CV and CC combination pairs.

In other features, the method further includes: converting an alternating current voltage received from the offboard charging station via the charging receptacle to a direct current voltage and supplying the direct current voltage to the high-voltage direct current bus; determining the alternative current voltage; and converting the alternating current voltage to the CV of the one of the CV and CC combination pairs for charging the rechargeable energy storage system.

In other features, the method further includes: looking up or calculating an estimated charge power value for each of at least some of the CV and CC combination pairs to provide charge power values; and based on the charge power values, select the one of the CV and CC combination pairs with the estimated charge power closest to but not greater than a smaller of a) a power capability of the offboard charging station, and b) a power capability of the onboard charging circuit.

In other features, the method further includes: determining a depth of discharge; looking up or calculating an estimated life expectancy of the rechargeable energy storage system for each of at least some of the CV and CC combination pairs; and based on the depth of discharge, selecting the one of the CV and CC combination pairs resulting in a rechargeable energy storage system life expectancy being closest to a target life expectancy without being shorter than the target life expectancy.

In other features, the method further includes: estimating at least one of resistance uncertainty and growth of the rechargeable energy storage system; based on the at least one of resistance uncertainty and growth, looking up or calculating estimated charge termination state of charge uncertainty of the rechargeable energy storage system for each of at least some of the CV and CC combination pairs; and based on the estimated charge termination state of charge uncertainties, selecting the one of the CV and CC combination pairs resulting in a charge termination state of charge uncertainty being closet to a target charge termination state of charge uncertainty without exceeding the target charge termination state of charge uncertainty.

In other features, the method further includes: for each of at least some of the CV and CC combination pairs, estimating a change in resistance of the rechargeable energy storage system, estimating an open circuit voltage based on the change in resistance and current supplied to the rechargeable energy storage system, estimating state of charge based on the estimated open circuit voltage, and determining a state of charge error based on the estimated state of charge and a target state of charge; and selecting the one of the CV and CC combination pairs with a highest corresponding power and having a state of charge error within a set error range.

In other features, the method further includes: determining whether the offboard charging station is a public station; determining whether the offboard charging station has a time-based cost for charging; in response to determining the offboard charging station being a public station and having a time-based cost for charging, looking up or calculating estimated charge power values for each of at least some of the CV and CC combination pairs to provide a plurality of charge power values; and based on the plurality of charge power values, selecting the one of the CV and CC combination pairs with the estimated charge power closest to but not greater than a smaller of a) a power capability of the offboard charging station, and b) a power capability of the onboard charging circuit.

In other features, the method further includes: determining whether the offboard charging station is a public station; in response to determining that the offboard charging station is a public station, implementing a charge time minimization method to select the one of the CV and CC combination pairs; and in response to determining that the offboard charging station is not a public station, implementing a maximum life charging method to select one of the CV and CC combination pairs.

In other features, the method further includes: determine a depth of discharge; determine a resistance uncertainty or growth of the rechargeable energy storage system; based on the depth of discharge, filter out some of the CV and CC combination pairs that do not satisfy a life requirement for the rechargeable energy storage system to provide a first resultant set of CV and CC combination pairs; filter out some of the first resultant set of CV and CC combination pairs that do not satisfy a state of charge accuracy requirement to provide a second resultant set of CV and CC combination pairs; and implement a charge time minimization method to select the one of the CV and CC combination pairs from the second resultant set of CV and CC combination pairs.

In other features, the method further includes: determine whether the offboard charging station is a direct current charging station or an alternating current charging station; in response to the offboard charging station being a direct current charging station, instruct the offboard charging station to charge the rechargeable energy storage system based on the selected CV and CC combination pair; and in response to the offboard charging station being an alternating current charging station, charge the rechargeable energy storage system based on the selected CV and CC combination pair.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

HV battery packs of electric vehicles are charged by connecting the electric vehicles to offboard charging stations. During a charge event, charge complete targets are met fora specific SOC (e.g., 96%). The charge complete targets include a pseudo-steady-state terminal CV and a pseudo-steady-state CC. A rested OCV corresponds to the targeted SOC. The SOC of a power source refers to a level of charge of the power source relative to a capacity of the power source. The SOC, for example, of a cell and/or battery pack module may refer to the voltage, current and/or amount of available energy stored in the cell and/or battery pack module. To achieve a complete charge complete, the targeted CV and CC are achieved. A CV and CC combination pair may be empirically and/or analytically determined to result in a rested OCV corresponding to the targeted SOC on charge complete.

Figure 1:
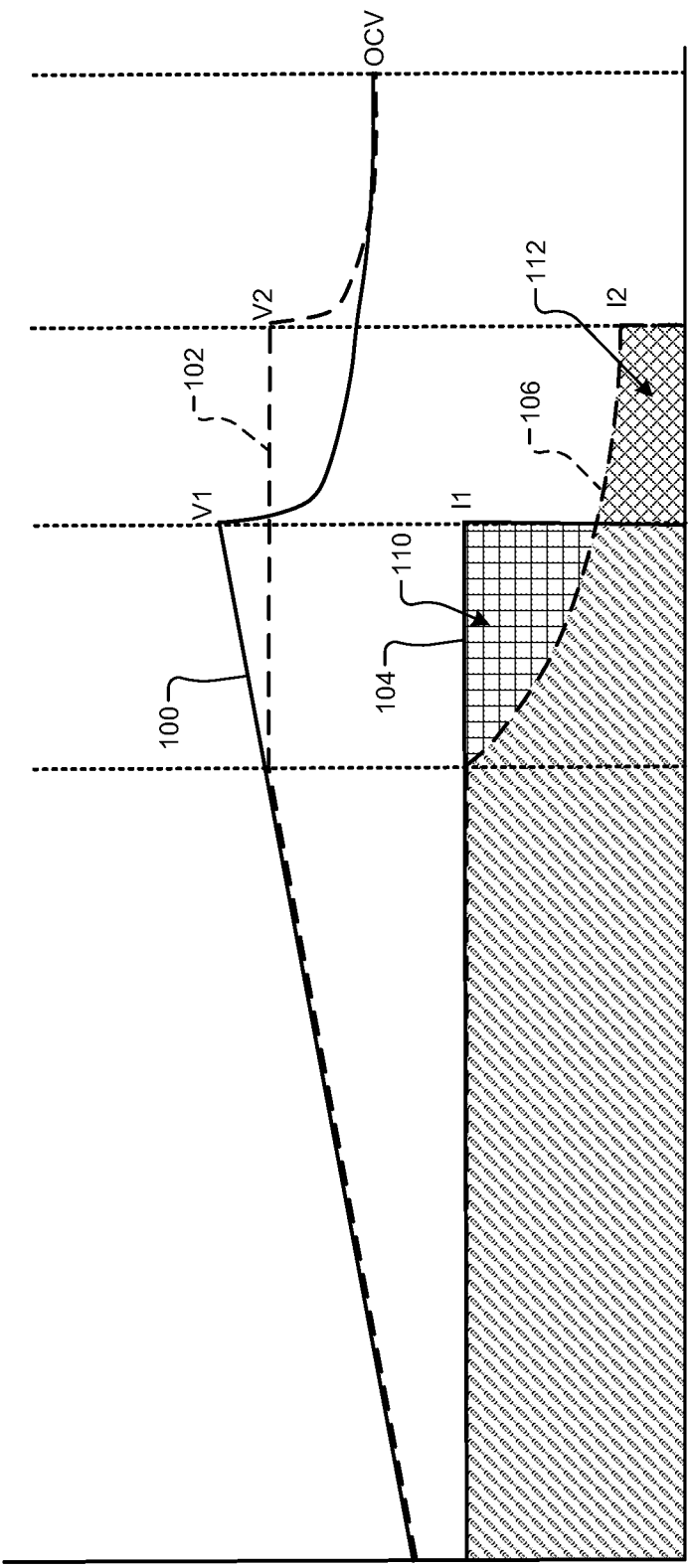
FIG. 1 is an example plot of current and voltage curves for two sets of terminal clamp voltage (CV) and cutoff current (CC) combination pairs providing a same open circuit voltage (OCV)

FIG. 1 shows an example plot of current and voltage curves for two sets of CV and CC combination pairs providing a same OCV. A first voltage curve 100, a second voltage curve 102, a first current curve 104, and a second current curve 106 are shown. The first voltage curve 100 has a CV of V1. The second voltage curve 102 has a CV of V2. V1 is greater than V2. The first current curve 104 has a CC of 11. The second current curve 106 has a CC of I2. I1 is greater than I2. The curves 100, 102 are associated with a first CV and CC combination pair. The curves 104, 106 are associated with a second CV and CC combination pair. As can be seen from the plot, charging using V1 and 11 provides a same OCV as charging using V2 and 12, even though the values of V2 and 12 are less and associated charge time is longer. The area 110 under curve 104 is equal in size to the area 112 under curve 106.

An electric vehicle may be charged using different types of offboard plug in charging (PIC) stations, referred to as L1, L2 and L3 type charging stations. An L1 charging station refers to use of a travel/portable charging station and travel cord set and plugging into a standard 120V power outlet. An L2 charging station refers to an alternating current (AC) HV charging station, which provides HV AC (e.g., 240 V AC) to the electric vehicle. An L3 charging station refers to a direct current fast charging (DCFC) station, which provides HV DC (e.g., 400 V or 800 V) to the electric vehicle.

Traditionally, a controller of an electric vehicle has a preselected single fixed CV and CC combination pair for each type of offboard charging station. For a given PIC station type, all PIC events charge terminate at the same CV and CC. The same CV and CC combination pair may be used for all types L1, L2 and L3 or different CV and CC combination pairs may be used respectively for the L1, L2 and L3 types of offboard charging stations. Power capabilities of offboard charging stations are increasing. Traditional offboard charging stations have a 3-7 kilowatt (kW) range. Modern offboard charging stations have a 19-22 kW range. The higher power range allows for quicker charging using higher CV and CC combination pairs. The use of higher CV and CC combination pairs for quicker charge times can have a negative effect on cell life, cell resistance, and/or charge termination accuracy, depending on the make-up and chemistry of the cells of the battery pack(s) and the application of use.

The examples set forth herein include charging systems and circuits that modify in real-time CV and CC combination pairs at which charging events complete. A CV and CC combination pair may be selected for each charge event independent and/or dependent of the charging station type. A CV and CC combination pair may be selected based on one or more factors including charge termination accuracy, rechargeable storage system (RESS) life expectancy, total charge time, public station costs for charging, power capabilities of offboard charging station, power capabilities of onboard charging, depths of discharge, change in RESS resistance, etc. In some embodiments, a CV and CC combination pair is selected for each charging event based on communication between a vehicle control module and an offboard charging station. In other example embodiments, one or more CV and CC combination pairs are selected for each charging event.

The implementations disclosed herein may be applied to fully electric vehicles, BEVs, hybrid electric vehicles including PHEVs, partially or fully autonomous vehicles, and other types of vehicles.

The term "power source" as used herein may refer to a battery pack, a battery module of a battery pack, one or more cells of a battery module of a battery pack, a battery, and/or other rechargeable power source. A battery pack may include multiple battery modules, which in turn may each include hundreds of cells. Thus, a power source may include multiple power sources. A power source may further include a cooling circuit, sensors, switches, terminals, a control module, etc.

Figure 2:
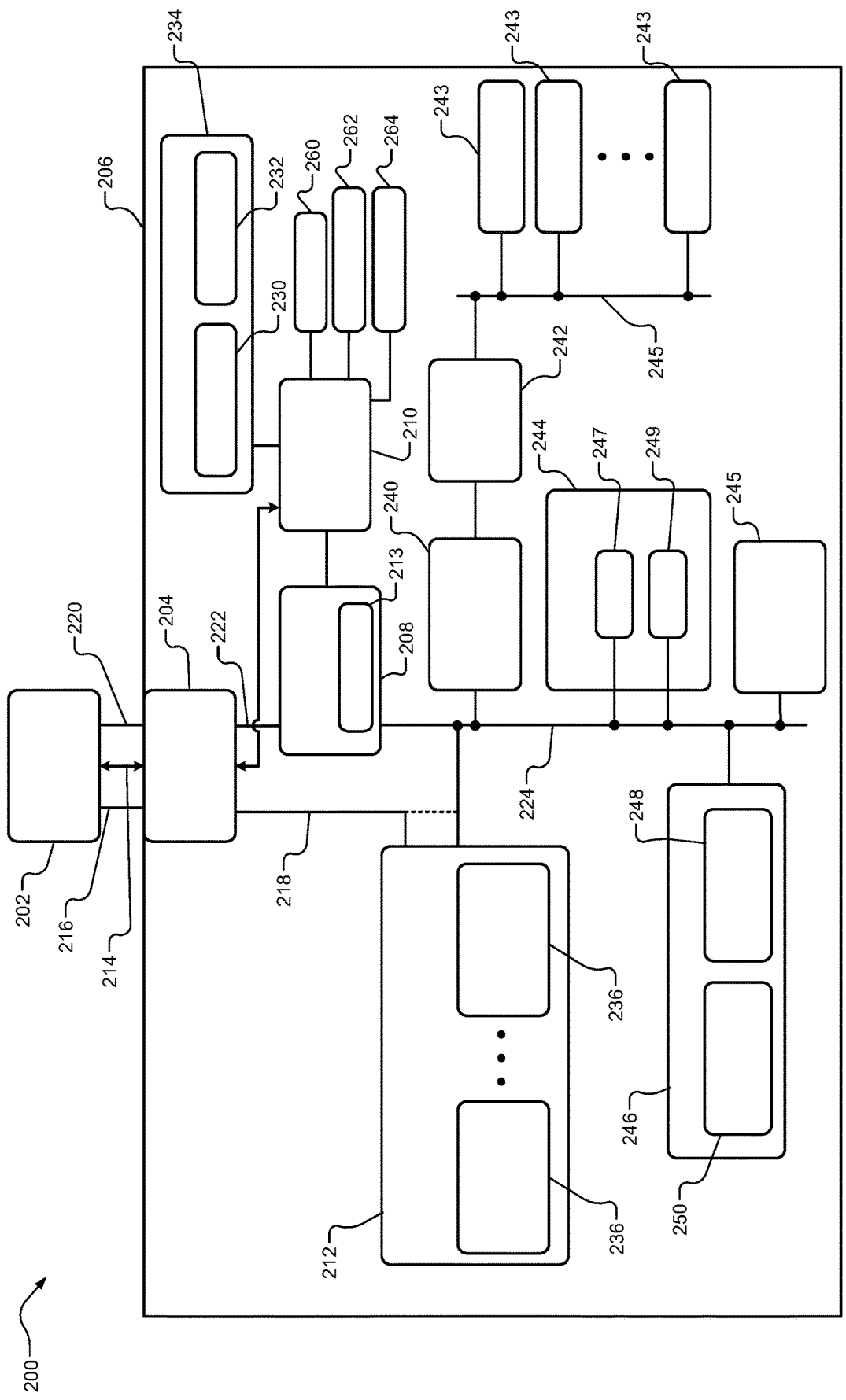
FIG. 2 is a functional block diagram of an example charging system including a vehicle integration control module implementing a CV and CC application in accordance with the present disclosure.

FIG. 2 shows a charging system 200 that includes an offboard charging station 202, a charging receptacle 204 of a vehicle 206, an onboard charging module (OBCM) 208, a vehicle integration control module (VICM) 210 and a RESS 212. The OBCM 208 includes an AD-to-DC converter 213 that converts HV AC to HV DC. The OBCM 208 controls an amount of current and power on the HV DC bus 224, a portion of which makes it to the RESS 212 during charging of the RESS 212. The OBCM 208 receives an AC voltage from the offboard charging station 202 and reports the AC voltage to the VICM 210. The OBCM 208 may regulate the voltage on the HV DC bus 224.

The VICM 210 communicates with the offboard charging station 202 via a communication line 214 and controls charging of the RESS 212 i) directly via a first HV DC line 216 and a second HV DC line 218, or ii) indirectly via a HV AC line 220, the OBCM 208, a line 222 between the charging receptacle 204 and the OBCM 208, and a HV DC bus 224. The communication may include determining charge capabilities of the offboard charging station 202 and may include instructions for setting CVs, CCs and/or power outputs of the offboard charging station 202. The HV DC line 218 may be connected to the HV DC bus 224. The VICM 210 implements a CV and CC application 230 using a CV and CC combination pair table 232, which are stored in memory 234. An example CV and CC combination pair table is shown below as Table 1.

TABLE 1

| Sample CV and CC Combination Pairs | |
|---|---|
| CV (V) | CC (A) |
| 4.13 | 3.0 |
| 4.14 | 5.0 |
| 4.15 | 10.0 |
| 4.16 | 20.0 |
| 4.17 | 30.0 |
| 4.20 | 50.0 |

Table 1 is shown as an example. The CV and CC combination pair table 232 may include any number of CV and CC combination pairs. The CC values may be for providing a predetermined SOC percentage (e.g., 96%). The CV and CC application 230 is implemented by the VICM 210 to select CV and CC combination pairs based on the above-stated factors. The CV and CC application 230 may include implementing one or more of the methods of FIGS. 3-4 and 7-10. The RESS 212 may include one or more battery packs 236, which may be connected in series and/or parallel.

The vehicle 206 further includes an auxiliary power module (APM) 240, a heating ventilation and air-conditioning (HVAC) system 244, a propulsion system 246, and/or other HV power sources. The APM 240 may convert the HV DC on the HV DC bus 224 to a LV DC and provide the LV DC to a LV power source 242 (e.g., a 12 V battery, a multiple output dynamically adjustable capacity system (MODACS), a 48 V power source, etc.). The LV power source 242 may have one or more positive terminals at one or more positive voltage potentials (e.g., 12 V and 48 V). The LV power source 242 supplies power to LV systems and/or devices 243, such as lighting systems, infotainment systems, navigation systems, object detection and/or collision avoidance systems, seat heaters and/or motors, window motors, door locks, etc. Although a single LV DC bus 245 is shown, more than one LV DC bus may be included. The HVAC system 244 may include a coolant electric heater (CEH) 247 and an air compressor electric compressor (ACEC) 249. The propulsion system 246 may include one or more motors 248 and may include an internal combustion engine 250, which are used to drive one or more axles and corresponding wheels of the vehicle 206.

In some embodiments, the VICM 210 changes CV and CC combination pairs in real time. In "real time" refers to selecting one or more CV and CC combination pairs prior to and/or during each charging event. A "charging event" may refer to each time the vehicle 206 is plugged into a charging station, such as the offboard charging station 202. The offboard charging station 202 may be a L1, L2 or L3 type charging station. The VICM 210 may change CV and CC combination pairs based on communication with the offboard charging station 202 and information collected from sensors 260. The sensors 260 may include voltage sensors, current sensors, temperature sensors, etc. The current and voltage sensors may detect current and/or voltages of loads (e.g., loads 243, 247, 249, etc.), HV DC bus 224, LV DC bus 245, etc. The current and voltage sensors may detect current supplied to the RESS 212 and/or voltages of the RESS 212. The current and voltage sensors may detect current drawn from the offboard charging station 202 and/or voltage provided by the offboard charging station 202.

Figure 8:
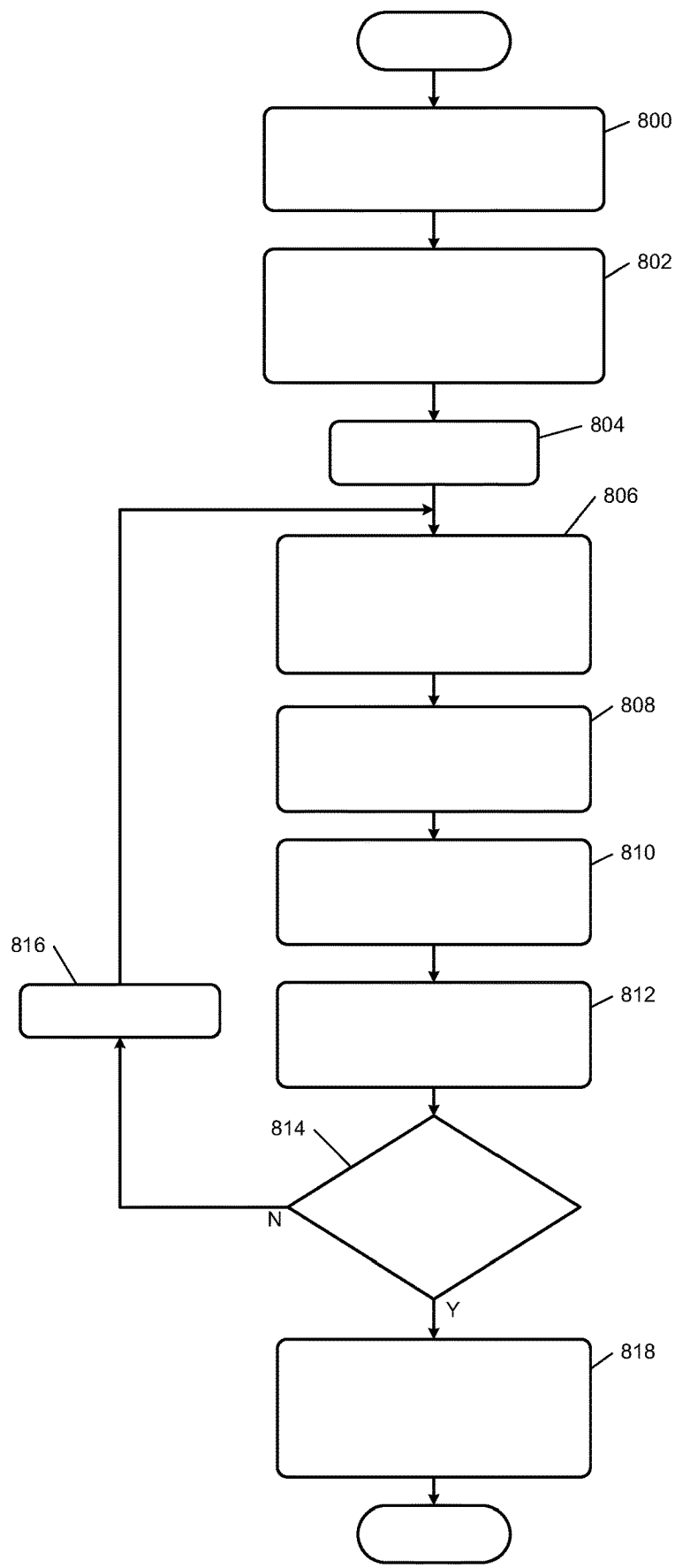
FIG. 8 illustrates an example method of adjusting a CV and CC combination pair based on change in RESS resistance and state of charge (SOC) error in accordance with the present disclosure.
Figure 9:
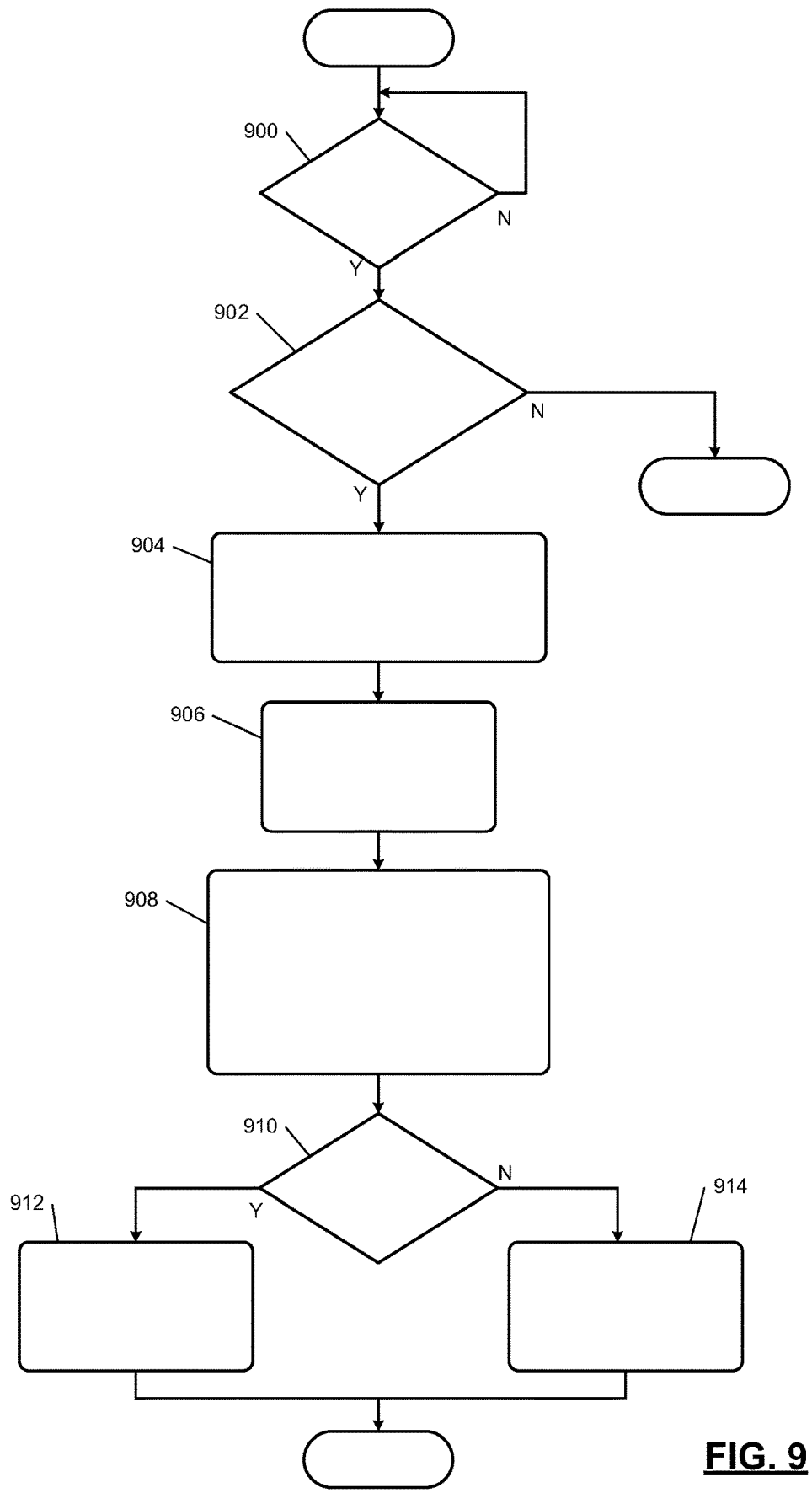
FIG. 9 illustrates an example method of modifying a CV and CC combination pair in real time as a function of whether an offboard charger is a public charger having a cost based on charge time in accordance with the present disclosure.
Figure 10:
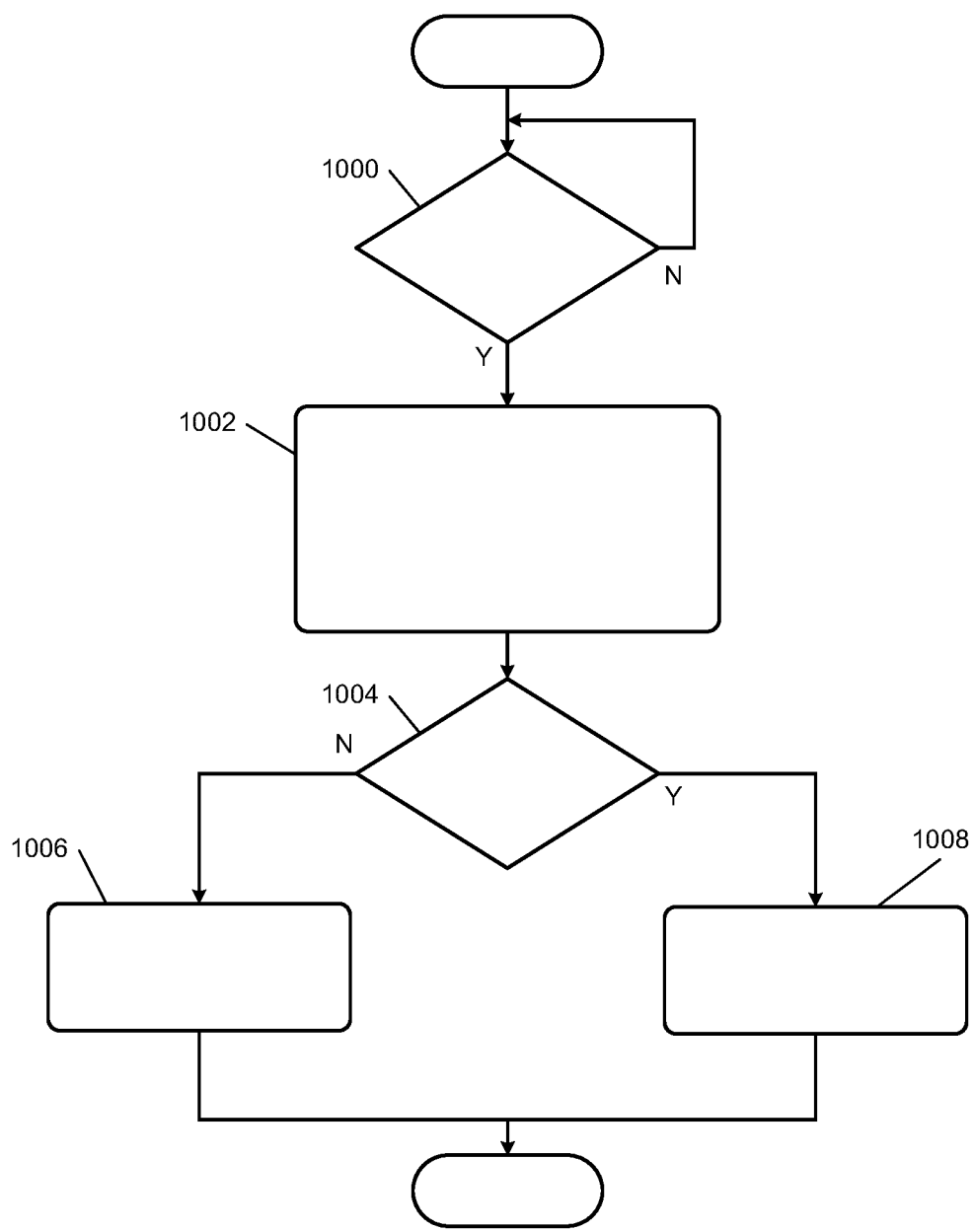
FIG. 10 illustrates an example arbitration method for adjusting a CV and CC combination pair in real time and in accordance with the present disclosure.

The CV and CC combination pairs may be selected using the methods of FIGS. 3-4 and 7-10 prior to and/or during each charging event. This includes selecting CV and CC pairs based on one or more of the above-stated factors. One or more of the methods may be performed for each charging event based on the situation and arbitration rules. The VICM 210 may implement arbitration to determine the appropriate CV and CC combination pair for any given situation. Example arbitration methods with arbitration rules are described below. One such method is shown in FIG. 10. The methods of FIGS. 3-4 and 7-9 include different criteria and logical reasoning for selecting the CV and CC combination pairs. The methods may include reducing a stored set of CV and CC combination points down to a selectable subset of CV and CC combination pairs and then selecting a best CV and CC combination pair from the subset of CV and CC combination pairs.

The vehicle 206 may further include a global positioning system (GPS) receiver 262 and a MAP module 264. The GPS receiver 262 may provide vehicle location information. The MAP module 264 may provide map information and/or charging station information, such as: charging station type information for the location of the offboard charging station 202; whether the charging station is a public charging station; and/or whether the charging station has a time-based cost for charging. The map information may also or alternatively indicate whether the vehicle 206 and/or offboard charging station 202 is in a parking structure. The VICM 210 may determine the type of the offboard charging station 202 based on this information. As an example, if the offboard charging station is located in a parking structure, then the offboard charging station may be determined to be a public charging station with a time-based cost for charging. Alternatively, the VICM 210 may determine through communication with the offboard charging station and/or with another network device the type and/or characteristics of the offboard charging station 202 including whether the offboard charging station 202 is a public or private charging station and/or whether the offboard charging station 202 has a time-based cost for charging.

Figure 3:
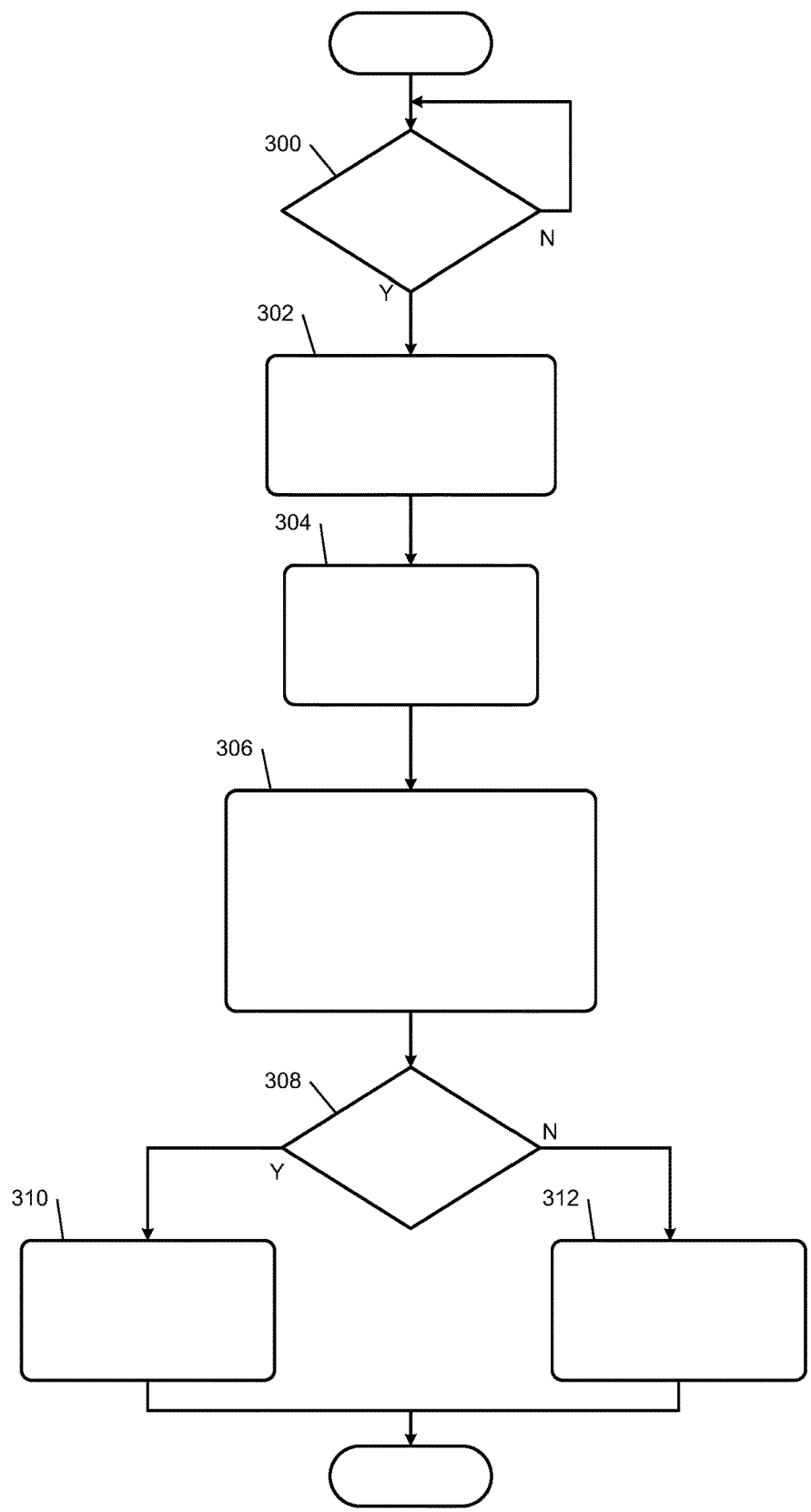
FIG. 3 illustrates an example charge time minimization method for changing a CV and CC combination pair in real time and in accordance with the present disclosure.

Although the methods of FIGS. 3-4 and 7-10 are shown as separate methods, two or more of the methods may be implemented for a charging event. The operations of the methods may be iteratively performed. The operations may be performed by the VICM 210 of FIG. 2. FIG. 3 shows a charge time minimization method for changing a CV and CC combination pair in real time.

At 300, the VICM 210 may determine whether the vehicle 206 is plugged into the offboard charging station 202. If yes, operation 302 is performed.

At 302, the VICM 210 may identify offboard and onboard charging power capabilities via communication with the offboard charging station 202. This may include determining voltages, current levels and/or power output capabilities of the offboard charging station 202 and/or voltages, current levels and/or power input capabilities of the onboard charging system (or circuit) of the vehicle 206. The stated voltages, current levels and/or power levels may be indicated via the communication line 214.

As an example, the VICM 210 may determine voltage, current and power capabilities of the offboard charging station 202 while the RESS 212 is being actively charged by the offboard charging station 202. This may include determining AC charging capability of the offboard charging station 202 including: a maximum wall (or output) current capability; a maximum wall (or output) voltage, which may be measured by the OBCM 208; and a wall power capability. The wall power capability is a product of the wall current capability and the wall voltage capability. The VICM 210 may determine a DCFC capability including a maximum offboard charging station current and power capabilities.

The VICM 210 may calculate the resulting DC current supplied to the HV DC line 218 and/or HV DC bus 224. During AC charging, a product of the wall power available and OBCM efficiency is divided by the HV DC bus voltage to provide the HV DC bus current out of the OBCM 208. During DCFC, a minimum of i) a maximum current out of the offboard charging station 202, and ii) a maximum power out of the offboard charging station 202 divided by a the HV DC bus voltage, is determined.

The VICM 210 may also calculate HV losses and subtract the losses from the DC current supplied to the HV DC line 218 and/or HV DC bus 224. The losses include parasitic loads and/or losses. Some example losses include losses associated with air-conditioning, heating, LV power loads, etc. The losses may include current and/or power drawn by the APM 240, the HVAC system 244, and/or other HV loads 245. The losses may be actively measured in real time via the sensors 260 including the current drawn from loads including the CEH 247, ACEC 249 and/or other loads. By subtracting the losses (HV bus current from OBCM 208 minus other HV current draws outside of RESS 212), HV current capability to the RESS 212 is determined.

At 304, the VICM 210 may look up and/or calculate estimated charge power for each CV and CC combination pair, such as each CV and CC combination pair in the CV/CC table 232.

At 306, the VICM 210 may select the CV and CC combination pair with the estimated charge power that is closest to but not greater than the smaller of a) power capability of the offboard charging station 202, and b) power capability of the onboard charging system (or circuit). More than one CV and CC combination pair may satisfy the power capabilities. The power associated with a CV and CC combination pair may be equal to a product of CV and CC. For example, two or more of the CV and CC combination pairs of Table 1 may satisfy the power capabilities. One or more of the CV and CC combination pairs of Table 1 may not satisfy the power capabilities. The smaller the CV and CC values in a CV and CC combination pair, the slower the charging of the RESS 212. In an embodiment, the VICM 210 may select a highest CV and CC combination pair based on charge power capabilities of an offboard charging station 202 and the onboard charging capabilities of the vehicle 206 and to minimize charge complete time. Thus, the CV and CC combination pair with the highest values that satisfy the power capabilities may be selected. This includes not exceeding the power capabilities of the offboard charging station 202 and/or the onboard charging system (or circuit), which includes the charging receptacle 204, the lines 218, 222, the OBCM 208 and the RESS 212.

In one embodiment, onboard and offboard power capabilities (or limits) are determined. For each power limit and for charge termination conditions (CV and CC combination pairs), the VICM 210 determines what power termination would be and then selects one closest to the lower of the power limits. The onboard and offboard power capabilities dictate how many different CV and CC combination pairs can be selected from.

In an embodiment, the largest one of the CC values that does not exceed the HV current capability to the RESS 212 is selected. The CV corresponding to the selected CC is also selected. As an example, if HV current to RESS 212 is 19 amperes (A), then the 4.15 V and 10.0 A CV and CC combination pair is selected from Table 1. As another example, if HV current is 20 A, then the 4.16 V and 20.0 A CV and CC combination pair is selected from Table 1. The described selection process may also include interpolating between CV values in Table 1 to match a determined HV current capability to RESS 212 and calculate the corresponding new CV. This may be done instead of selecting one of the CV and CC combination pairs included in Table 1. The HV current capability to RESS 212 may be a value above, between or below the CC values in Table 1. Interpolation, estimation and/or curve fitting may be used to calculate a corresponding CV. The CC and CV may then be used as a new pair (or point).

At 308, the VICM 210 may determine whether the offboard charging station 202 is a DC charging station. If yes, operation 310 may be performed, otherwise operation 312 may be performed.

At 310, the VICM 210 may instruct the offboard charging station 202 to charge the RESS 212 based on the selected CV and CC combination pair, which is to be provided to charge the RESS 212. The offboard charging station 202 regulates a CV and CC provided to the charging receptacle 204 and to the RESS 212. In an embodiment, the actual CV and CC provided by the offboard charging station 202 are larger than the selected CV and CC combination pair due to the calculated losses. The VICM 210 may determine the actual CV and CC combination pair provided by the offboard-charging station 202 to provide the CV and CC combination pair selected for charging the RESS 212 and indicate the actual CV and CC combination pair to the offboard charging station 202.

At 312, the VICM 210 may charge the RESS 212 based on the selected CV and CC combination pair by controlling operation of the OBCM 208, which may regulate the CV and CC provided to the RESS 212. The VICM 210 may determine the actual CV and CC combination pair provided by the offboard-charging station 202 to provide the CV and CC combination pair selected for charging the RESS 212 and indicate the actual CV and CC combination pair to the offboard charging station 202.

Figure 4:
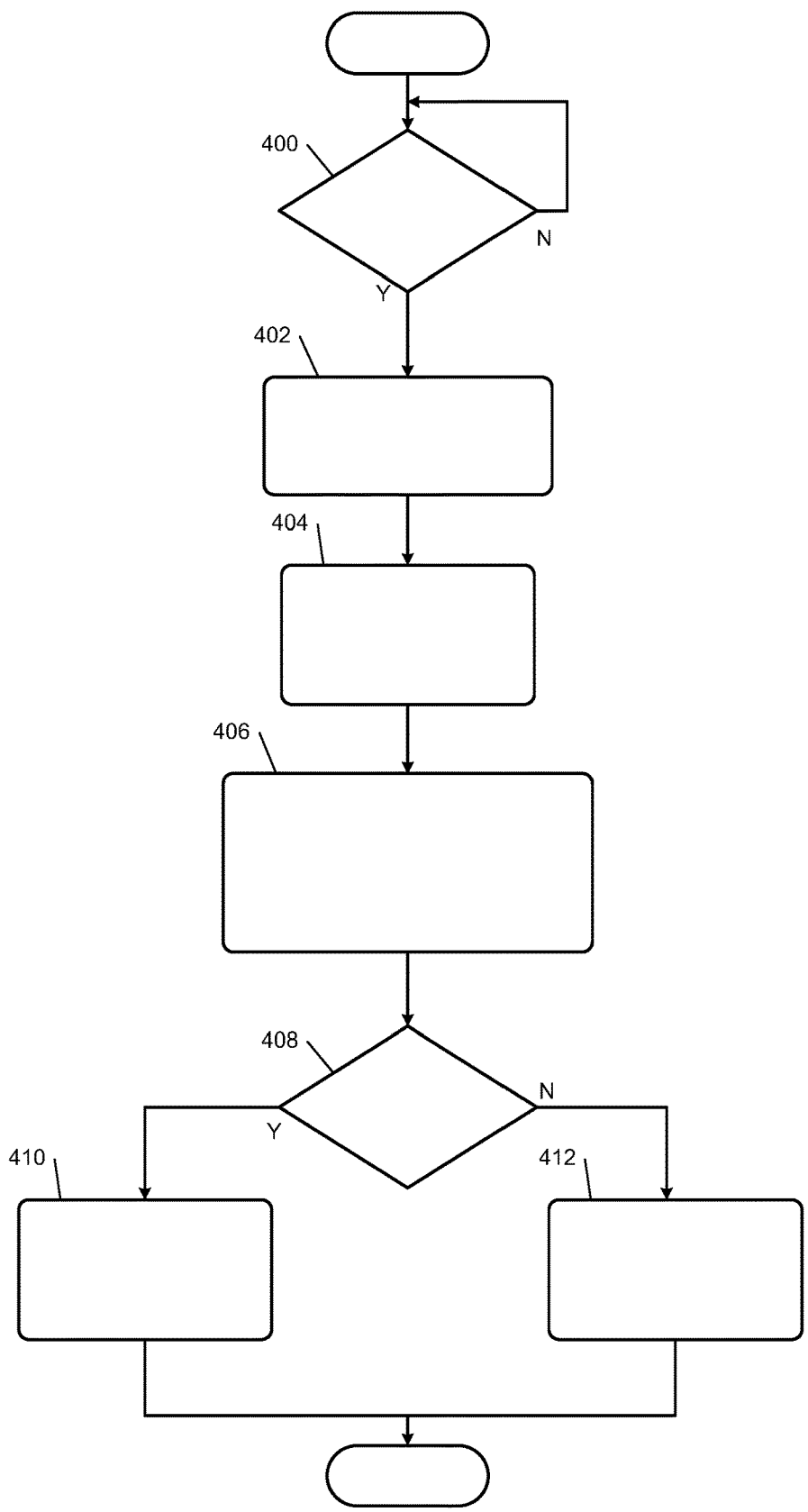
FIG. 4 illustrates an example RESS life charging method for changing a CV and CC combination pair in real time and in accordance with the present disclosure.

FIG. 4 shows a RESS life charging method for changing a CV and CC combination pair in real time. The VICM 210 of FIG. 2 may select a highest CV and CC combination pair to reduce RESS degradation and thus increase RESS life expectancy. The CV and CC combination pair may be selected to optimize the RESS life expectancy to a target life expectancy. In one embodiment, the RESS degradation is minimized and the RESS life expectancy is maximized. In another embodiment, the CV and CC combination pair is selected such that the RESS life expectancy is greater than or equal to a target RESS life expectancy (e.g., 10 years, 12 years or 15 years), which may be less than a maximum life expectancy. In one embodiment, the CV and CC combination pair is selected such that the RESS life expectancy is longer than (or exceeds) the target RESS life expectancy.

At 400, the VICM 210 may determine whether the vehicle 206 is plugged into the offboard charging station 202. If yes, operation 402 is performed.

At 402, the VICM 210 may identify a typical DoD of the vehicle 206 and/or a typical DoD of the vehicle 206 when used by a particular user (e.g., a particular driver) of the vehicle 206.

At 404, the VICM 210 may look up and/or calculate estimated RESS life expectancy in years, months and/or days for each CV and CC combination pair.

At 406, the VICM 210 may select the CV and CC combination pair resulting in the RESS life expectancy being closest to a target RESS life expectancy without being shorter than the target RESS life expectancy. The CV and CC combination pair is selected as described above. This may including selecting a CV and CC combination pair to minimize RESS degradation and thus improve (or maximize) RESS life expectancy. Alternatively, the CV and CC combination pair may be selected to optimize the RESS life expectancy to match or exceed a target RESS life expectancy, which may be shorter than the maximum life expectancy. Charging may be implemented at a slow rate to improve accuracy of a charge termination SOC. In an embodiment, the CV and CC combination pair is selected based on the chemical makeup and/or chemistry of the battery pack(s) of the RESS 212. Certain chemistries have a longer life if charged slowly. Other chemistries have a longer life if charged quickly. In an embodiment, the RESS 212 is charged with a constant current. In another embodiment, the RESS 212 is charged with a current that is tapered down.

In one embodiment, a DoD is determined, which is directly related to battery life expectancy and a CV is determined based on the DoD. The corresponding CC is then selected for the selected CV.

Figure 5:
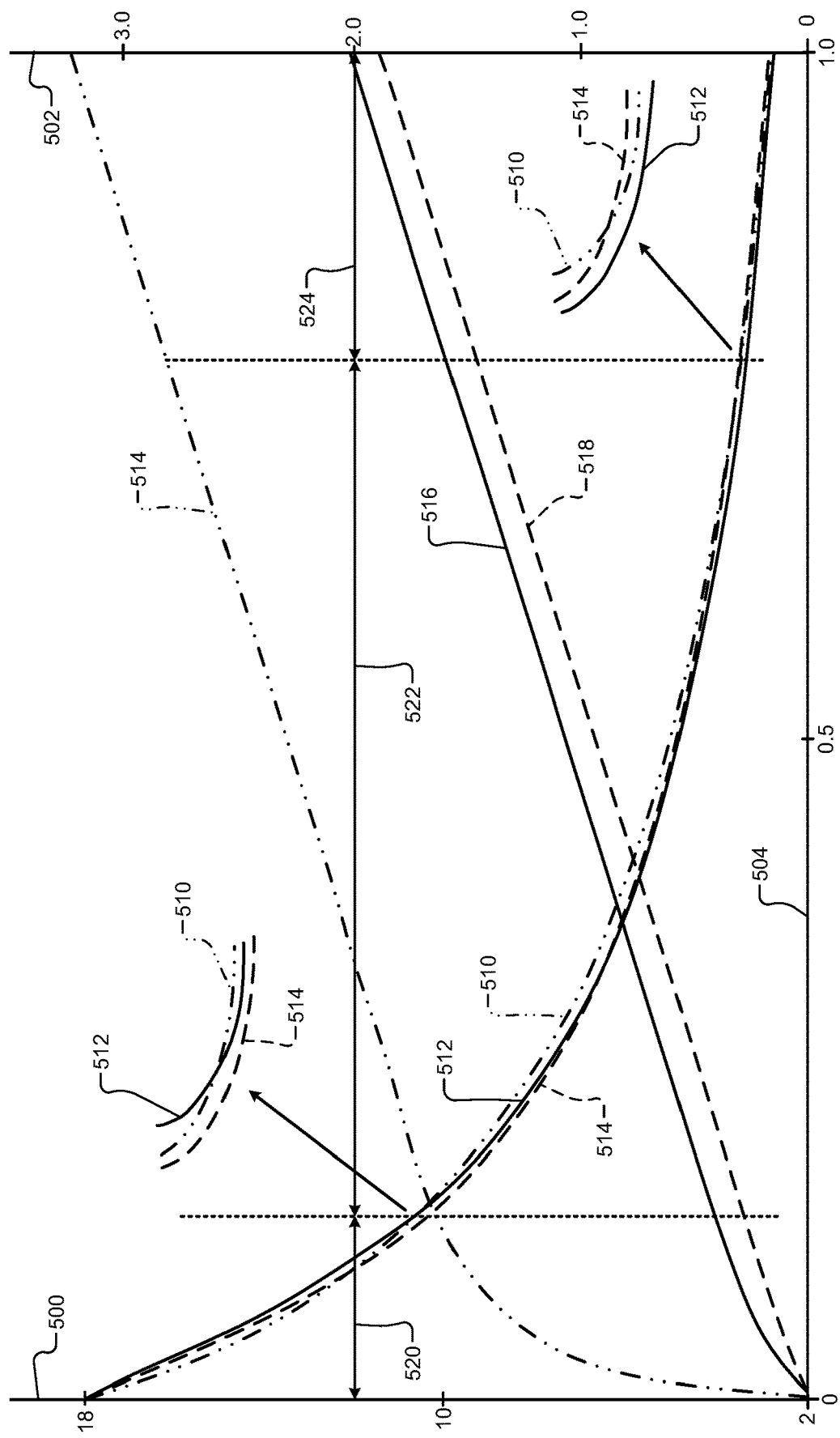
FIG. 5 is an example plot of battery life expectancy and charge time versus depth of discharge (DoD)

FIG. 5 shows a plot of battery life expectancy and charge time versus depth of discharge (DoD). The left-side vertical axis 500 refers to battery life expectancy in number of years until there is 75% capacity when fully charged as compared to when new. The right-side vertical axis 502 refers to charging time in hours. The horizontal axis 504 refers to DoD. Curves 510, 512, 514 relate battery life expectancy to DoD for three different CVs (e.g., 4.13, 4.17 and 4.20). The curves 510, 512, 514 have corresponding charging time versus DoD curves 514, 516, 518.

Three ranges 520, 522, 524 are shown. When selecting the CV that provides the longest RESS life expectancy, the lowest of the three CVs (e.g., 4.13 V) may be selected for the second range 522. The second CV (e.g., 4.17 V) may be selected for the first range 520. The third CV (e.g., 4.20 V) may be selected for the third range 524. As shown in FIG. 5 there are two crossover points. As an example, and for a particular driver and vehicle, the driver may drive an average number of miles per day. An average mileage of the vehicle may be determined by determining a ratio between i) the total number of miles driven since the vehicle was new, and ii) the total number of days since the vehicle was new may be determined. An average or expected range in miles on a full SOC (e.g., 96%) for the vehicle may also be estimated or determined. As an example, with an average mileage of 35 miles/day and an expected range of 100 miles, the DoD may be 0.35. Using the curves of FIG. 5, the expected RESS life expectancy may be estimated. Using values of the plot, the expected RESS life expectancy may be 7-8 years.

The DoD may be calculated using multiple different methods. As another example, the DoD may be calculated based on a difference between a maximum SOC and a minimum SOC. The DoD may be determined for each of multiple days and then averaged to provide an average DoD. The maximum SOC may be a maximum SOC for that particular day. Similarly, the minimum SOC may be a minimum SOC for that particular day.

Battery (or RESS) life expectancy may be improved by selecting a higher CV and CC combination pair, depending on the chemical makeup of that power source. This may also be different depending on the use case (e.g., a privately owned vehicle having a low per day mileage versus a public transportation vehicle or fleet vehicle having a high per day mileage). Selection of CV and CC combination pairs is based on natural use degradation of RESS 212 over time, not other failure mechanisms.

At 408, the VICM 210 may determine whether the offboard charging station 202 is a DC charging station. If yes, operation 410 may be performed, otherwise operation 412 may be performed.

At 410, the VICM 210 may instruct the offboard charging station 202 to charge the RESS 212 based on the selected CV and CC combination pair. The offboard charging station 202 regulates a CV and CC provided to the RESS 212.

At 412, the VICM 210 may charge the RESS 212 based on the selected CV and CC combination pair by controlling operation of the OBCM 208, which may regulate a CV and CC provided to the RESS 212.

Figure 6:
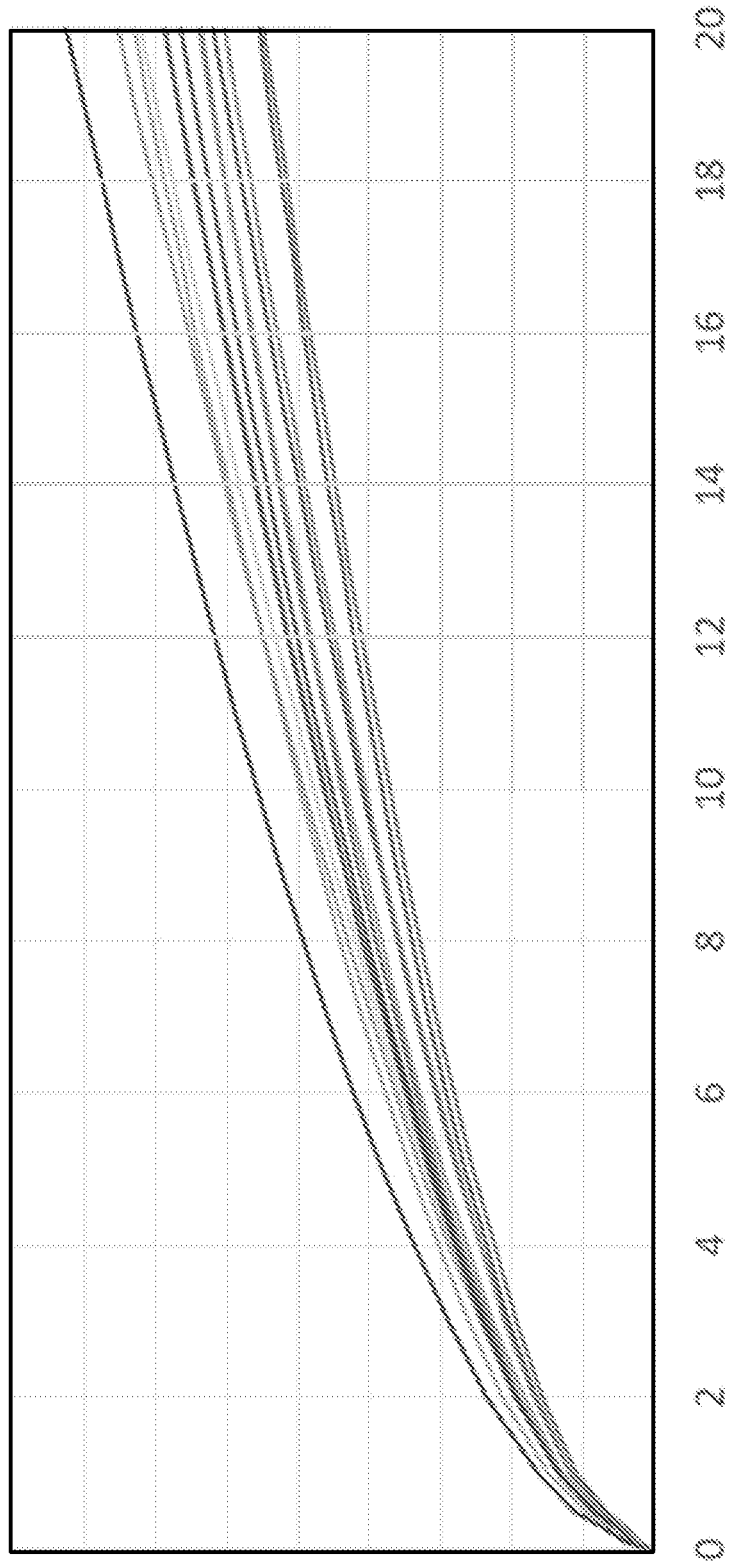
FIG. 6 is an example plot of percentage increase in beginning of lifetime cell resistance versus cell age for different use cases.

FIG. 6 shows a plot of percentage increase in beginning of lifetime (BOL) cell resistance versus cell life (or age) in years for different use cases. CV and CC combination pairs may be selected based on change in cell resistance or change in RESS resistance, as described below with respect to the method of FIG. 7. In FIG. 6, multiple curves are shown for different respective scenarios, such as a daily driver, a periodic driver, a vehicle driven in a hot climate, a vehicle driven in a cold climate, drivers and vehicles having different DoDs, driving patterns, etc. As can be seen from FIG. 6, as a given population of cells age across multiple vehicles, the mean resistance of that population will increase, along with the variation in resistance across that population. The older the cell, the more unpredictable the cell performance and the more resistance of the cell grows. The higher the resistance, the lower the peak fully charged voltage of the cell and the lower the OCV of the cell. To negate the effect of higher resistance and on SOC accuracy, the CC may be reduced. For example, if targeting 96% SOC±1% and resistance has increased, then the CC may be tapered down to lower the CV and CC combination pair. In an embodiment, as the cell (or RESS) ages, a lower CC may be selected to increase charge termination accuracy.

Equations 1-4 relate an OCV ($V_{oc}$) and a terminal voltage $V_T$. The terminal voltage $V_T$ varies based on cell resistance, voltage hysteresis, diffusion voltage, and other effects (chemical properties). The terminal voltage $V_T$ of the RESS 212 of FIG. 2 is the CV prior to charge complete. $V_{oc}$ is the open circuit voltage of the RESS 212 after being at rest for a period of time. I is the current to the RESS 212 and is the CC prior to charge complete. $R_o$ is the known BOL resistance of the RESS 212 and OR refers to unknown resistance growth due to aging. $V_{other}$ represents other effects such as voltage hysteresis, diffusion voltage, and the double layer effect.

$$V_{OC}=V_T-I*R_o-I*\Delta R-V_{other} \quad (1)$$

$$V_T=V_{oc}+I*R+V_{Other} \quad (2)$$

$$V_{oc}=V_T-I*(R_o+\Delta R)-V_{other} \quad (3)$$

$$V_{oc}=V_T-I*R_o-I+\Delta R-V_{other} \quad (4)$$

For a fixed $V_T$, the greater the value of OR, the more a target $V_{oc}$ is undershot. When there is a higher anticipated uncertainty in OR, or a high estimated value of OR, error in the target $V_{oc}$ can be minimized by minimizing I (e.g., by selecting a lower CV and CC combination point). The I*ΔR portion of equation 1, is associated with an amount of increase in resistance of the RESS 212 as the RESS 212 ages.

Figure 7:
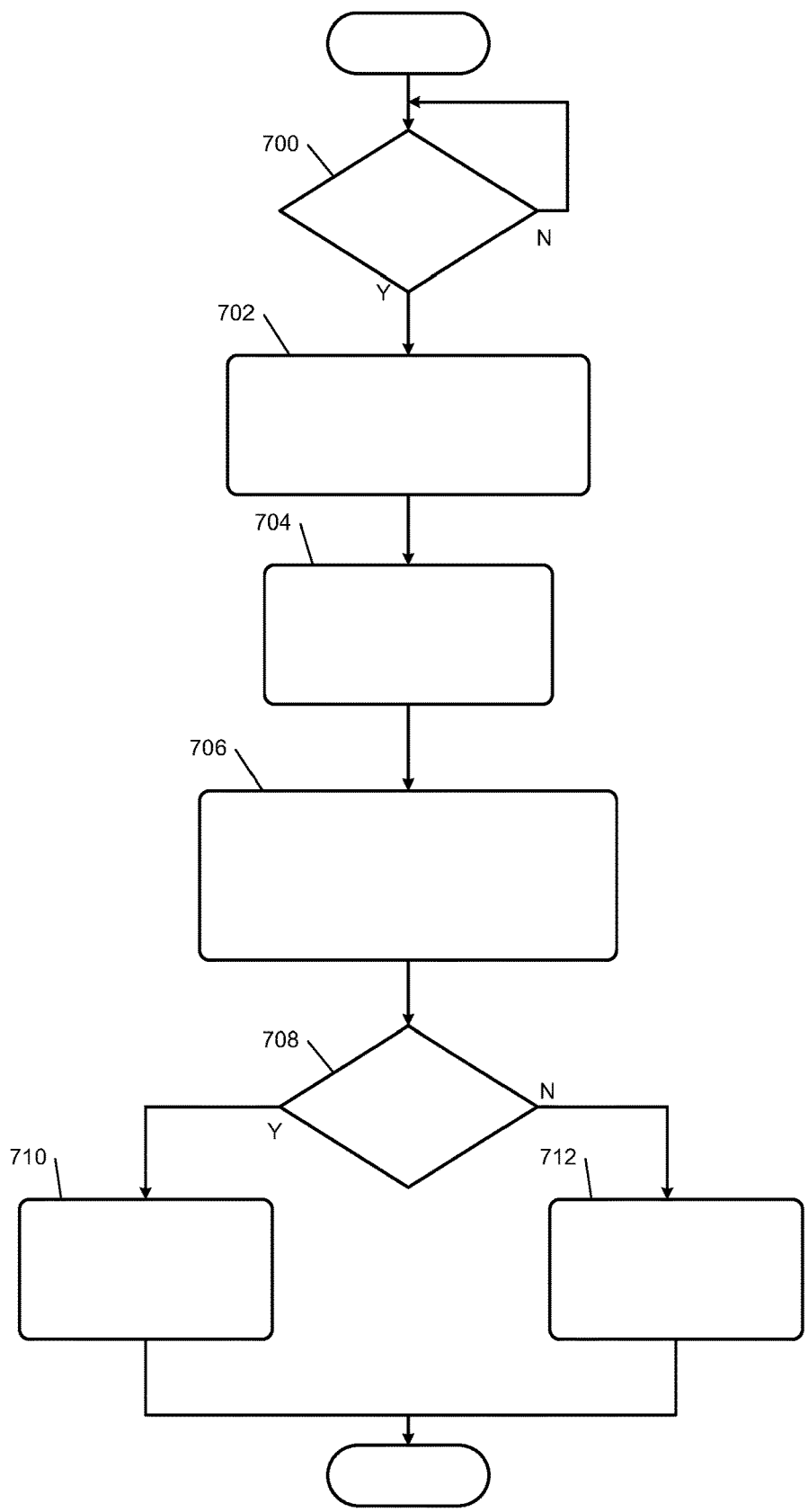
FIG. 7 illustrates a method of lowering a CV and CC combination point in real time as a function of RESS resistance growth and/or uncertainty in accordance with the present disclosure.

FIG. 7 shows a method of lowering a CV and CC combination point in real time as a function of RESS resistance growth and uncertainty to increase charge termination SOC accuracy.

At 700, the VICM 210 may determine whether the vehicle 206 is plugged into the offboard charging station 202. If yes, operation 702 is performed.

At 702, the VICM 210 may estimate the RESS resistance uncertainty and/or growth based on mileage of a vehicle as indicated on an odometer and/or based on calendar life of the vehicle and/or calendar life (time since new and/or first used) of the battery pack(s) of the RESS 212. The RESS resistance uncertainty and/or growth may be estimated using a plot similar to that shown in FIG. 6, a lookup table relating RESS resistance uncertainty and/or growth to mileage and/or life expectancy of vehicle and/or RESS, and/or one or more equations relating RESS resistance uncertainty and/or growth to mileage and/or life expectancy of vehicle and/or RESS. At 704, the VICM 210 may look up and/or calculate estimated charge termination SOC uncertainty for each CV and CC combination pair. The method of FIG. 8 may be performed to estimated charge termination SOC uncertainty.

At 706, the VICM 210 may select CV and CC combination pair resulting in charge termination SOC uncertainty being closest to a target charge termination SOC uncertainty without exceeding the target charge termination SOC uncertainty. See the method of FIG. 8. As an example, the resulting charge termination SOC uncertainty may be within 0.5% of the target charge termination SOC uncertainty without exceeding the target charge termination SOC uncertainty.

At 708, the VICM 210 may determine whether the offboard charging station 202 is a DC charging station. If yes, operation 710 may be performed, otherwise operation 712 may be performed.

At 710, the VICM 210 may instruct the offboard charging station 202 to charge the RESS 212 based on the selected CV and CC combination pair. The offboard charging station 202 regulates a CV and CC provided to the RESS 212.

At 712, the VICM 210 may charge the RESS 212 based on the selected CV and CC combination pair by controlling operation of the OBCM 208, which may regulate a CV and CC provided to the RESS 212.

FIG. 8 shows a method of adjusting a CV and CC combination pair based on change in RESS resistance and state of charge (SOC) error.

At 800, the VICM 210 may estimate a real time resistance of the RESS 212. At 802, the VICM 210 may estimate change in resistance for life of the cells of the battery pack(s) of the RESS 212 based on real time resistance of the RESS 212 and an initial resistance of the RESS 212 when new. The real time resistance may be measured and/or determined based on outputs of one or more of the sensors 260. On or more of the sensors 260 may be used to determine parameters of the RESS 212, based on which the real time resistance may be estimated.

At 804, the VICM 210 may set a counter equal to 1. At 806, the VICM 210 may estimate an OCV based on a target OCV and a product of current and change in resistance of the RESS 212. At 808, the VICM 210 may estimate a SOC based on the estimated OCV. This may be done, for example, using a lookup table relating estimated OCV values to SOC values.

At 810, the VICM 210 may determine a SOC error based on the estimated SOC and a target SOC. The SOC error may be equal to a difference between the target SOC and the estimated SOC. At 812, the VICM 210 may store a SOC error for a corresponding $i^{th}$ CV and CC combination pair, where i is an index value referring to a particular CV and CC combination pair.

At 814, the VICM 210 may determine whether the value of the counter is equal to a total number of CV and CC combination pairs. If not, operation 816 is performed and the counter is incremented. If yes, operation 818 may be performed. At 818, the VICM 210 may pick a CV and CC combination pair with a highest corresponding power and having a state of charge error within a set error range (e.g., 0.5%).

FIG. 9 shows a method of modifying a CV and CC combination pair in real time as a function of whether an offboard charger is a public charger having a cost based on charge time.

At 900, the VICM 210 may determine whether the vehicle 206 is plugged into the offboard charging station 202. If yes, operation 902 is performed.

At 902, the VICM 210 may determine whether the offboard charging station 202 is a public station with a charge time-based fee associated with charging the RESS 212. The VICM 210 of FIG. 2 may determine whether the offboard charging station 202 is a public or private charging station. This may be determined based on the location of the vehicle 206 and/or communication with the offboard charging station 202. If not public and/or there is no time-based fee for charging, the method may end, otherwise operation 904 may be performed.

At 904, the VICM 210 may identify offboard and onboard charging power capabilities, as described above, via communication with the offboard charging station 202. The offboard charging station 202 may indicate charging power capability of the offboard charging station 202 to the VICM 210, including maximum charging voltage, maximum charging current, and/or maximum output power. The VICM 210 may identify charging power capability of the onboard charging system (or circuit) including maximum charging voltage, maximum charging current, and/or maximum power received.

At 906, the VICM 210 may look up and/or calculate an estimated charge power for each CV and CC combination pair.

At 908, the VICM 210 may select a CV and CC combination pair with an estimated charge power that is closest to but not greater than the smaller of a) power capability of the offboard charging station 202, and b) power capability of the onboard charging system (or circuit).

At 910, the VICM 210 may determine whether the offboard charging station 202 is a DC charging station. If yes, operation 912 may be performed, otherwise operation 914 may be performed.

At 912, the VICM 210 may instruct the offboard charging station 202 to charge the RESS 212 based on the selected CV and CC combination pair. The offboard charging station 202 regulates a CV and CC provided to the RESS 212.

At 914, the VICM 210 may charge the RESS 212 based on the selected CV and CC combination pair by controlling operation of the OBCM 208, which may regulate a CV and CC provided to the RESS 212.

By performing operations 904, 906, 908, 910, 912, 914 in response to the offboard charging station 202 being a public charging station that has an associated cost for charging, the charge time is minimized to minimize the costs for charging the RESS 212. To minimize charging costs, the amount of charge time may be minimized by selecting a CV and CC combination pair for quick charging.

FIG. 10 shows an arbitration method for adjusting a CV and CC combination pair in real time. As an example, the CV and CC combination pair that provides the most accurate SOC may, for example, not provide the fastest charge time and/or be the best CV and CC combination pair for maximizing RESS life. The arbitration is between using the RESS maximum life charging method of FIG. 4 and the charge time minimization method of FIG. 3.

At 1000, the VICM 210 may determine whether the vehicle is plugged into a charging station. If yes, operation 1002 may be performed.

At 1002, the VICM 210 may filter, out of a total list (or table) of possible CV and CC combination pairs, discrete CV and CC combination pairs that do not meet charge termination accuracy requirements. The charge termination accuracy requirements are a function of RESS resistance growth (or change in RESS resistance over time). Higher CV and CC combination pairs and higher RESS resistance growth/uncertainty drives more charge termination SOC inaccuracy.

At 1004, the VICM 210 may determine whether the offboard charging station 202 is a public station. If not, operation 1006 may be performed, otherwise operation 1008 may be performed.

At 1006, the VICM 210 may implement the RESS maximum life charging method to select a CV and CC combination pair that maximizes RESS life (also referred to as longevity) and minimizes RESS degradation. At 1008, the VICM 210 may implement the charge time minimization method to select a CV and CC combination pair that minimizes charge time.

As yet another arbitration example, the VICM 210 may start with a given number X of discrete CV and CC combination pairs. The VICM 210 may then identify a typical user DoD and RESS resistance/uncertainty. The VICM 210 may then filter out points that don't meet a life expectancy requirement, which is a function of DoD. An example life expectancy requirement may be 10 years and 100,000 miles for a RESS. The VICM 210 may then filter out CV and CC combination pairs (or points) that don't meet SOC accuracy requirements. The VICM 210 may then select a CV and CC combination pair, from the remaining CV and CC combination pairs, to minimize charge time.

The above-described examples, which include real-time modification and selection of CV and CC combination pairs for charge termination: reduce and/or minimize charge time; reduce and/or minimize RESS capacity degradation associated with charging; increase charge termination SOC accuracy; reduce user costs for public charging of a RESS; and provide greater ability to meet time of day charging needs of users including targeting a user-specified time for charge complete.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C #, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A charging system for an electric vehicle, the charging system comprising:
   a memory configured to store a plurality of terminal clamp voltage (CV) and a cutoff current (CC) combination pairs, wherein a terminal CV refers to a voltage at terminals of a rechargeable energy storage system at a point in time when charging of the rechargeable energy storage system is complete, and wherein a CC refers to an amount of charging current to the rechargeable energy storage system at the point in time when charging of the rechargeable energy storage system is complete;
   a charging receptacle configured to connect to an offboard charging station; and
   an onboard charging circuit comprising
      a high-voltage direct current bus connected to the rechargeable energy storage system, and
      a control module configured to communicate with the offboard charging station and determine charging capabilities of the offboard charging station and the onboard charging circuit, to select one of the plurality of CV and CC combination pairs based on the charging capabilities of the offboard charging station and the onboard charging circuit, and to initiate charging of the rechargeable energy storage system based on the selected one of the plurality of CV and CC combination pairs.

2. The charging system of claim 1, further comprising an onboard charging module configured to:
   convert an alternating current voltage received from the offboard charging station via the charging receptacle to a direct current voltage and supply the direct current voltage to the high-voltage direct current bus;
   indicate to the control module the alternative current voltage; and
   receive an instruction from the control module to convert the alternating current voltage to the CV of the one of the plurality of CV and CC combination pairs for charging the rechargeable energy storage system.

3. The charging system of claim 1, wherein the control module is configured to:
   look up or calculate an estimated charge power value for each of at least some of the plurality of CV and CC combination pairs to provide a plurality of charge power values; and based on the plurality of charge power values, select the one of the plurality of CV and CC combination pairs with the estimated charge power closest to but not greater than a smaller of a) a power capability of the offboard charging station, and b) a power capability of the onboard charging circuit.

4. The charging system of claim 1, wherein the control module is configured to:
determine a depth of discharge;
look up or calculate an estimated life expectancy of the rechargeable energy storage system for each of at least some of the plurality of CV and CC combination pairs; and
based on the depth of discharge, select the one of the plurality of CV and CC combination pairs resulting in a rechargeable energy storage system life expectancy being closest to a target life expectancy without being shorter than the target life expectancy.

5. The charging system of claim 1, wherein the control module is configured to:
estimate at least one of resistance uncertainty and growth of the rechargeable energy storage system;
based on the at least one of resistance uncertainty and growth, look up or calculate estimated charge termination state of charge uncertainty of the rechargeable energy storage system for each of at least some of the plurality of CV and CC combination pairs; and
based on the estimated charge termination state of charge uncertainties, select the one of the plurality of CV and CC combination pairs resulting in a charge termination state of charge uncertainty being closet to a target charge termination state of charge uncertainty without exceeding the target charge termination state of charge uncertainty.

6. The charging system of claim 1, wherein the control module is configured to:
for each of at least some of the plurality of CV and CC combination pairs,
estimate a change in resistance of the rechargeable energy storage system,
estimate an open circuit voltage based on the change in resistance and current supplied to the rechargeable energy storage system,
estimate state of charge based on the estimated open circuit voltage, and
determine a state of charge error based on the estimated state of charge and a target state of charge; and
select the one of the plurality of CV and CC combination pairs with a highest corresponding power and having a state of charge error within a set error range.

7. The charging system of claim 1, wherein the control module is configured to:
determine whether the offboard charging station is a public station;
determine whether the offboard charging station has a time-based cost for charging;
in response to determining the offboard charging station being a public station and having a time-based cost for charging, look up or calculate estimated charge power values for each of at least some of the plurality of CV and CC combination pairs to provide a plurality of charge power values; and
based on the plurality of charge power values, select the one of the plurality of CV and CC combination pairs with the estimated charge power closest to but not greater than a smaller of a) a power capability of the offboard charging station, and b) a power capability of the onboard charging circuit.

8. The charging system of claim 1, wherein the control module is configured to:
determine whether the offboard charging station is a public station;
in response to determining that the offboard charging station is a public station, implement a charge time minimization method to select the one of the plurality of CV and CC combination pairs; and
in response to determining that the offboard charging station is not a public station, implement a maximum life charging method to select one of the plurality of CV and CC combination pairs.

9. The charging system of claim 1, wherein the control module is configured to:
determine a depth of discharge;
determine a resistance uncertainty or growth of the rechargeable energy storage system;
based on the depth of discharge, filter out some of the plurality of CV and CC combination pairs that do not satisfy a life requirement for the rechargeable energy storage system to provide a first resultant set of CV and CC combination pairs;
filter out some of the first resultant set of CV and CC combination pairs that do not satisfy a state of charge accuracy requirement to provide a second resultant set of CV and CC combination pairs; and
implement a charge time minimization method to select the one of the plurality of CV and CC combination pairs from the second resultant set of CV and CC combination pairs.

10. The charging system of claim 1, wherein the control module is configured to:
determine whether the offboard charging station is a direct current charging station or an alternating current charging station;
in response to the offboard charging station being a direct current charging station, instruct the offboard charging station to charge the rechargeable energy storage system based on the selected CV and CC combination pair; and
in response to the offboard charging station being an alternating current charging station, charge the rechargeable energy storage system based on the selected CV and CC combination pair.

11. The charging system of claim 1, wherein at least two of the plurality of CV and CC combination pairs have a same rested open circuit voltage for the terminals of the rechargeable energy storage system.

12. The charging system of claim 11, wherein the control module is configured, during a charging event, to charge the rechargeable energy storage system based on each of the at least two of the plurality of CV and CC combination pairs.

13. The charging system of claim 12, wherein the control module is configured, during the charging event, to i) charge the rechargeable energy storage system based on a first CV and CC combination pair of the at least two of the plurality of CV and CC combination pairs for a first period of time and based on a second CV and CC combination pair of the at least two of the plurality of CV and CC combination pairs for a second period of time, and ii) switch from charging based on the first CV and CC combination pair to charging based on the second CV and CC combination pair based on a resistance of the rechargeable energy storage system, a depth of discharge, the power capabilities of the offboard charging station, and power capabilities of the onboard charging circuit.

14. A method of charging a rechargeable energy storage system of an electric vehicle, the method comprising:
storing a plurality of terminal clamp voltage (CV) and a cutoff current (CC) combination pairs, wherein a terminal CV refers to a voltage at terminals of the rechargeable energy storage system at a point in time when charging of the rechargeable energy storage system is complete, and wherein a CC refers to an amount of charging current to the rechargeable energy storage system at the point in time when charging of the rechargeable energy storage system is complete;
transferring power between an offboard charging station and a high-voltage direct current bus of an onboard charging circuit of the electric vehicle, the high-voltage direct current bus being connected to the rechargeable energy storage system;
communicating with the offboard charging station and determining charging capabilities of the offboard charging station and the onboard charging circuit;
selecting one of the plurality of CV and CC combination pairs based on the charging capabilities of the offboard charging station and the onboard charging circuit; and
charging of the rechargeable energy storage system based on the selected one of the plurality of CV and CC combination pairs.

15. The method of claim 14, further comprising:
determining a depth of discharge;
looking up or calculating an estimated life expectancy of the rechargeable energy storage system for each of at least some of the plurality of CV and CC combination pairs;
estimating at least one of resistance uncertainty and growth of the rechargeable energy storage system;
based on the at least one of resistance uncertainty and growth, looking up or calculating estimated charge termination state of charge uncertainty of the rechargeable energy storage system for each of at least some of the plurality of CV and CC combination pairs; and
based on the depth of discharge and the estimated charge termination state of charge uncertainties, selecting the one of the plurality of CV and CC combination pairs resulting in i) a rechargeable energy storage system life expectancy being closest to a target life expectancy without being shorter than the target life expectancy, and ii) a charge termination state of charge uncertainty being closet to a target charge termination state of charge uncertainty without exceeding the target charge termination state of charge uncertainty.

16. The method of claim 14, further comprising:
for each of at least some of the plurality of CV and CC combination pairs,
estimating a change in resistance of the rechargeable energy storage system,
estimating an open circuit voltage based on the change in resistance and current supplied to the rechargeable energy storage system,
estimating state of charge based on the estimated open circuit voltage, and
determining a state of charge error based on the estimated state of charge and a target state of charge; and
selecting the one of the plurality of CV and CC combination pairs with a highest corresponding power and having a state of charge error within a set error range.

17. The method of claim 14, further comprising:
determining whether the offboard charging station is a public station;
determining whether the offboard charging station has a time-based cost for charging;
in response to determining the offboard charging station being a public station and having a time-based cost for charging, looking up or calculating estimated charge power values for each of at least some of the plurality of CV and CC combination pairs to provide a plurality of charge power values; and
based on the plurality of charge power values, selecting the one of the plurality of CV and CC combination pairs with the estimated charge power closest to but not greater than a smaller of a) a power capability of the offboard charging station, and b) a power capability of the onboard charging circuit.

18. The method of claim 14, further comprising:
determining whether the offboard charging station is a public station;
in response to determining that the offboard charging station is a public station, implementing a charge time minimization method to select the one of the plurality of CV and CC combination pairs; and
in response to determining that the offboard charging station is not a public station, implementing a maximum life charging method to select one of the plurality of CV and CC combination pairs.

19. The method of claim 14, further comprising:
determine a depth of discharge;
determine a resistance uncertainty or growth of the rechargeable energy storage system;
based on the depth of discharge, filter out some of the plurality of CV and CC combination pairs that do not satisfy a life requirement for the rechargeable energy storage system to provide a first resultant set of CV and CC combination pairs;
filter out some of the first resultant set of CV and CC combination pairs that do not satisfy a state of charge accuracy requirement to provide a second resultant set of CV and CC combination pairs; and
implement a charge time minimization method to select the one of the plurality of CV and CC combination pairs from the second resultant set of CV and CC combination pairs.

20. The method of claim 14, further comprising:
determine whether the offboard charging station is a direct current charging station or an alternating current charging station;
in response to the offboard charging station being a direct current charging station, instruct the offboard charging station to charge the rechargeable energy storage system based on the selected CV and CC combination pair; and
in response to the offboard charging station being an alternating current charging station, charge the rechargeable energy storage system based on the selected CV and CC combination pair.

* * * * *